United States Patent
Gerö et al.

(10) Patent No.: US 12,050,928 B2
(45) Date of Patent: Jul. 30, 2024

(54) METHOD AND APPARATUS OF PROVIDING A FUNCTION AS A SERVICE (FAAS) DEPLOYMENT OF AN APPLICATION

(71) Applicant: Telefonaktiebolaget LM Ericsson (publ), Stockholm (SE)

(72) Inventors: Balázs Peter Gerö, Budapest (HU); Bence Formanek, Budapest (HU); András Kern, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 478 days.

(21) Appl. No.: 17/296,606

(22) PCT Filed: Dec. 5, 2018

(86) PCT No.: PCT/EP2018/083610
§ 371 (c)(1),
(2) Date: May 25, 2021

(87) PCT Pub. No.: WO2020/114586
PCT Pub. Date: Jun. 11, 2020

(65) Prior Publication Data
US 2022/0004422 A1 Jan. 6, 2022

(51) Int. Cl.
*G06F 9/46* (2006.01)
*G06F 9/38* (2018.01)
*G06F 9/50* (2006.01)

(52) U.S. Cl.
CPC .......... *G06F 9/463* (2013.01); *G06F 9/3836* (2013.01); *G06F 9/5038* (2013.01); *G06F 9/5077* (2013.01)

(58) Field of Classification Search
CPC ...... G06F 9/463; G06F 9/3836; G06F 9/5038; G06F 9/5077; G06F 9/5072; G06F 8/60; G06F 9/5027
See application file for complete search history.

(56) References Cited

U.S. PATENT DOCUMENTS 10,120,665 B1 11/2018 Sunarno
10,671,360 B1 * 6/2020 Todd .................. G06F 9/5072
(Continued)

OTHER PUBLICATIONS

ETSI, "Network Functions Virtualisation (NFV); Management and Orchestration; Vi-Vnfm reference point—Interface and Information Model Specification", ETSI GS NFV-IFA 006 v2.1.1; Apr. 1, 2016; pp. 1-109.

*Primary Examiner* — Kenneth Tang
(74) *Attorney, Agent, or Firm* — Coats & Bennett PLLC

(57) ABSTRACT

It is disclosed a method and an apparatus (80) of providing a function as a service, faas, deployment of an application. A deployment unit is generated (30, 44, 508) per group of application blocks, where said deployment unit comprises said group of application blocks, and an implementation of function invocation for functions being accessed by groups of application blocks. Function invocations of the group of application blocks are constrained or bound (604, 610, 612) to libraries of supporting implementations. Deployment units are provided (32, 48, 510) together with the element invocations attached to said libraries, to a lifecycle manager of a faas platform, whereby the faas platform implements the faas deployment of said application the performance targets of which, being related to the groups of application blocks. This disclosure enables a developer to adjust the performance of an application without having to change the logic of application implementations.

16 Claims, 7 Drawing Sheets

(56) References Cited

U.S. PATENT DOCUMENTS

| | | | |
|---|---|---|---|
| 2019/0028552 A1* | 1/2019 | Johnson, II | H04L 67/146 |
| 2019/0050258 A1* | 2/2019 | Kim | G06F 9/5011 |
| 2019/0332366 A1* | 10/2019 | Natanzon | G06F 11/3696 |
| 2019/0354354 A1* | 11/2019 | Dubinskii | G06F 11/3466 |
| 2020/0073783 A1* | 3/2020 | Hortala | G06F 9/54 |
| 2020/0177621 A1* | 6/2020 | Boulton | H04L 63/1425 |
| 2021/0263779 A1* | 8/2021 | Haghighat | G06F 21/78 |

* cited by examiner ns, so called, lambda functions. It has been noted that performance and reliability characteristics of these different application deployments may be significantly different.
METHOD AND APPARATUS OF PROVIDING A FUNCTION AS A SERVICE (FAAS) DEPLOYMENT OF AN APPLICATION

TECHNICAL FIELD

This disclosure relates to cloud deployments of an application. In more particular, it relates to a method and an apparatus for providing a function as a service (faas) deployment of an application.

BACKGROUND

Cloud platforms nowadays offer several different application deployments, for instance I the form of virtual machines, containers, micro-services and anonymous functions, so called, lambda functions. It has been noted that performance and reliability characteristics of these different application deployments may be significantly different.

For instance, functions-based deployments are supported by function as a service (faas) platform, which allow a developer of the application to break down the applications into functions. When a first function is set to invoke another function, the first function requests the faas platform to run said another function via an invocation application programming interface (API) that is provided by the faas platform. In general, as part of invoking a function, the faas platform schedules the function to run on any servers of a particular cloud platform and passes a set of parameters, which are provided by the invoking first function.

Also, faas platforms typically assume that the application functions are stateless, in the sense that they do not support state preservation between subsequent function invocations. This means that, if state preservation is required, it becomes the responsibility of the application developer. State preservation can however be achieved by state externalization, wherein faas platforms may offer a data access API that allows a stateless function to read, write, etc. data blocks regardless of the locations of both the function and the data blocks.

There are proprietary web service step functions that let deployers coordinate multiple web services into server-less workflows. The deployers can design and run workflows that stitch together services into feature-rich applications. It is thereby possible to combine lambda functions and application containers.

It is known that cloud platforms can move deployment units between executions from one server to another. It is up to a scheduler module of the platform to decide when and where to move the deployment units. This decision is typically made during running of the application. To enable this feature, the platform provides the same APIs to the functions in the deployment unit, irrespective of the deployment units being co-located or not.

As part of implementing a cloud application, the application developer may manually decompose an overall functionality into individually deployable units, from said one or more different deployment forms, or granularities. Once the units are designed, the developer may optimize the internal structure of the deployment units, e.g., co-located application blocks, or functions, use different APIs than application blocks, or functions, across the deployable units. It has been the developer's responsibility to select among the available APIs or design a new API.

However, the application performance of an application, as perceived by a deployer, when deployed to different cloud platform instances, can differ, even when they are provided from the same manufacturer. Altering application characteristics may require the developer to change APIs or even manually designed boundaries of deployment units, which is time-consuming and error prone.

Implementations of an invocation, as provided by the faas platform, and data access APIs are designed to allow relocation of functions between executed invocations. This means that even if both an invoking function and an invoked function are located on the same server, complex procedures are performed, which increase the application latency.

In web service solutions, performance of the code of each step can depend on the runtime that is selected for the execution of the code. For activities that are run in containers, the code can wait for an operator to perform an action or to provide input, whereas lambda functions are usually called by event triggers. Further, in the web service solutions, software development kit, for activities and the one for lambda functions are different, which implicates that user code is not designed to be movable between lambda functions and activities.

Since the application characteristics/performance is an outcome of implementation decisions provided by a developer, e.g., API selection, reuse of code across applications with different characteristics requirements needs changing of the code.

Currently, it is typically up to the developer to optimize its code and to adapt the code to the cloud. Optimization decisions, therefore required, are typically hard coded into the application code. For instance, a developer may decide to use direct function invocations between its functions and wrap the whole code as one cloud function to optimize for latency. This limits reusability of the code, because parts of the code would need to be rewritten in order to split the functionality, for example, into two deployment units, for instance, to a part of another application with different performance requirements. Furthermore, during testing and/or operation, it may occur that a single deployment unit is not the most suitable solution, for example, the application may not fit into the highest flavor of the offered cloud deployment units. In this case, reorganization of the existing code requires significant effort.

There is hence a need for a solution addressing one or more of the issues as discussed above.

SUMMARY

It is an object of exemplary embodiments to address at least some of the issues outlined above, and this object and others are achieved by a method and an apparatus, according to the appended independent claims, and by the exemplary embodiments according to the dependent claims.

According to an aspect, this disclosure provides a method of providing a function as a service deployment of an application comprising application blocks. The method is performed in an application builder component. The method comprises generating a deployment unit per group of application blocks. The deployment unit comprises, in addition to the group of application blocks, an implementation of function invocation for each function being accessed by each group of application blocks, where generating the deployment unit further comprises constraining function invocations of the group of application blocks to one or more libraries of implementations. In addition, the method comprises providing the deployment units, together with the function invocations attached to said one or more libraries of implementations, to a lifecycle manager of a function as a service platform that is connected to the application builder component, whereby the function as a service platform implements the function as a service deployment of said application the performance targets of which, being related to the groups of application blocks.

According to another aspect, this disclosure provides an apparatus that is capable of providing a function as a service deployment of an application comprising application blocks. The apparatus comprises a processor and memory. The apparatus is configured to generate a deployment unit per group of application blocks, where the deployment unit comprises, in addition to the group of application blocks an implementation of function invocation for each function being accessed by each group of application blocks. The apparatus is further configured to constrain function invocations of the group of application blocks to one or more libraries of implementations. The apparatus is also configured to provide the deployment units, together with the function invocations attached to said one or more libraries of implementations, to a lifecycle manager of a function as a service platform that is connectable to the apparatus, whereby the function as a service platform is adapted to implement the function as a service deployment of said application the performance targets of which, being related to the groups of application blocks.

The proposed disclosure enables a developer of an application to adjust the performance characteristics of an application significantly without having to change the logic of application implementations, i.e. without having to make any changes to the code of the application blocks.

Hence, providing a function as a service deployment of an application having application blocks, significantly improves the application's flexibility in two respects, of which one is reusability of the code as part of another application, since the code does not need to be specially adapted to any application. The other respect being the ability to adjust requirements on the target performance, for instance in the case the application grows larger or if there is a need to deploy the application on different types of cloud deployment units, for instance when a new deployment of the application is implemented in a new edge cloud area.

BRIEF DESCRIPTION OF THE DRAWINGS

Embodiments will now be described in more detail, and with reference to the accompanying drawings, in which.

DETAILED DESCRIPTION

Figure 1A:
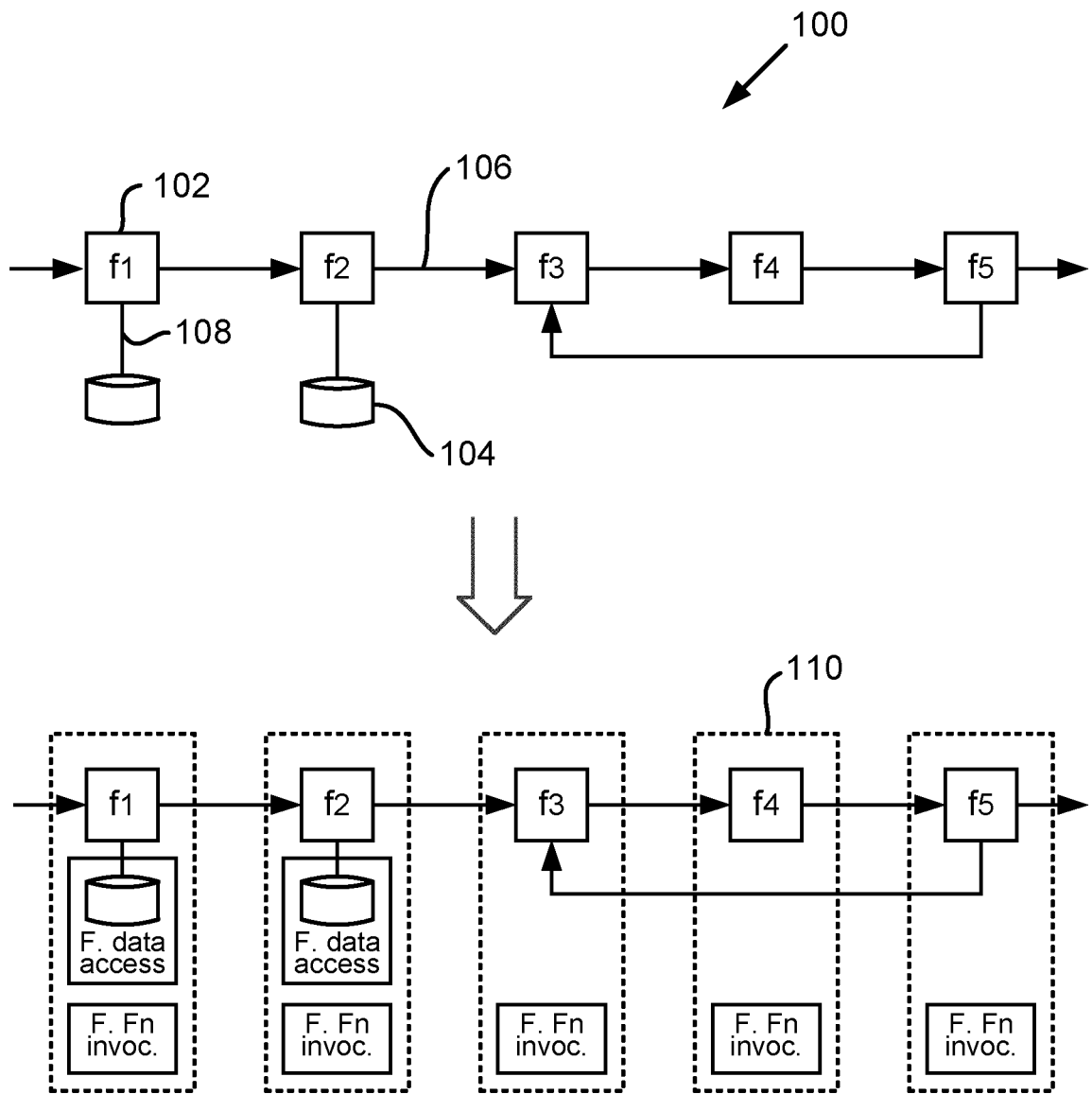
FIGS. 1A and 1B schematically present two examples of deployments based on one and the same application specification.

In the following description, different embodiments of the exemplary embodiments will be described in more detail, with reference to accompanying drawings. For the purpose of explanation and not limitation, specific details are set forth, such as particular examples and techniques in order to provide a thorough understanding.

It is noted that existing cloud platforms consider deployment units as, so called, black boxes, which implicates that the deployment units do not offer libraries for latency specific implementations within a certain deployment unit. For instance, there is usually no support for threading or shared memory. Furthermore, affinity requirements are defined only on the form of deployment units, i.e. the so called, deployment unit granularity.

Similarly, state of the art orchestration systems allow users or deployers to define affinity/anti-affinity and characteristics requirements, on the deployment unit granularity.

Moreover, since the application characteristics, of the prior art, are hard coded into an implementation, the scheduler of the cloud platform cannot be aware of application performance targets, and therefore, for which reason, cannot use application performance targets as constraints for deployments.

In general, software compilers typically transform the source code of a deployment unit to the native code of the server unit that in turn will run the code. Any optimizations, applied as part of the transformation, consider only the internals of the deployment unit.

The present disclosure provides features to application developers of a cloud development environment. These features utilize application performance targets, as provided by the developer to opt for appropriate deployment units, and appropriate implementation for invocations of one or more functions, and data access of said functions.

For example, user functions, or application blocks, selected based on application performance targets as provided a deployer, are grouped together to form a group of application blocks, or from the platform's point of view, a single deployment unit, in the form of a function as a service (faas) function, for instance. Functions, or application blocks, inside the group of application blocks, may use a local library, for example, to invoke each other or to access data with the group of application blocks, i.e. local data.

The present disclosure may be implemented by an extension of an interface to the developer, which extension allows the developer to guide function instance co-location, data store API selection, and function invocation API selection, depending on application performance targets.

The present disclosure may also comprise an artifact, deployment unit, generation method that packages provider selected, for instance collocated application blocks or functions, libraries of supporting software, data stores and API implementations as a deployment unit for an underlying faas platform, being an example of a cloud platform. The artifact generation method may also create configurations for the platform in question and configurations for the artifact, which configurations may be required to install and/or uninstall the artifacts on the platform.

In short, the present disclosure provides a deployment unit, or artifact, generation method that packages selected, e.g. collocated, functions, software libraries supporting said functions, data stores and API implementations, together as a deployment unit, or artifact, for an underlying faas/cloud platform. The artifact generation method typically also creates the faas platform configurations and artifact deployment unit configurations that may be required to perform lifecycle management, e.g. install/uninstall, of the deployment unit on the faas platform.

The present disclosure also provides a developer interface extension that allows the developer to guide function instance collocation, selection of API providers of data store and function invocation, via application performance targets.

As noted above, the proposed disclosure enables a developer of an application to adjust the performance characteristics of an application significantly without having to change the logic of application implementations, i.e. without having to make any changes to the code of the application blocks.

Hence, the method of providing a function as a service (faas) deployment of an application having application blocks, significantly improves the application's flexibility in two respects, of which one is reusability of the code as part of another application, since the code does not need to be specially adapted to any application. The other respect being the ability to adjust requirements on the target performance, for instance in the case the application grows larger or if there is a need to deploy the application on different types of cloud deployment units, for instance when a new deployment of the application is implemented in a new edge cloud area.

Figure 1B:
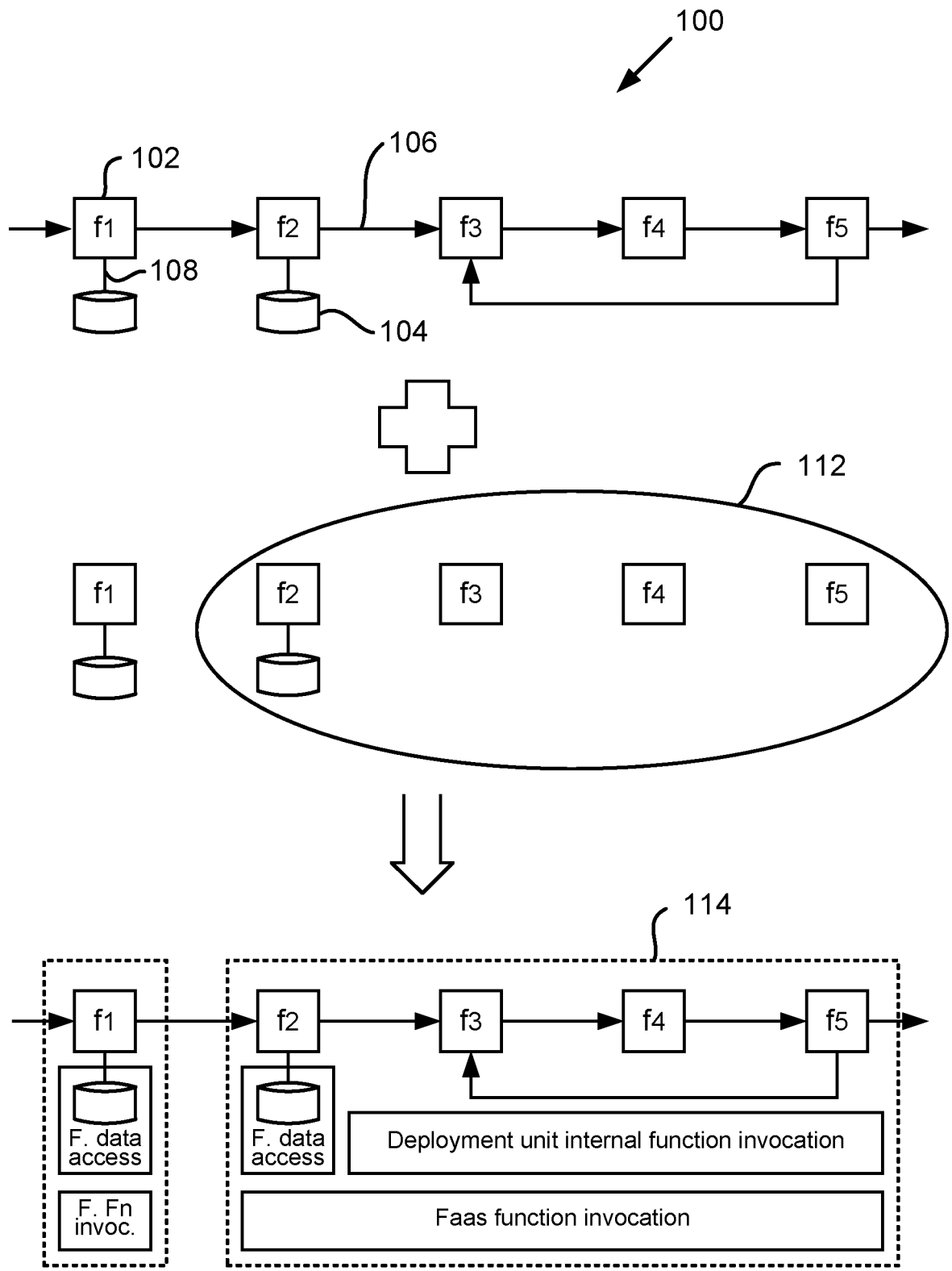

FIGS. 1A and 1B schematically present two examples of deployments based on one and the same application specification.

In FIG. 1A, the application specification 100 comprises functions 102, and externalized data 104, e.g. data that is external to the function by which it is accessible. The functions as herein illustrated are labeled $f_1$, $f_2$, $f_3$, $f_4$ and $f_5$.

Horizontal arrows 106 indicate that a function at the head of an arrow invokes the function at the tail end of the same arrow. Vertical links 108 between functions and externalized data 104 indicate data accesses.

A default deployment of the application specification makes use of one deployment unit 110 per function of the application and is based on function invocations and data access solutions being offered by an underlying function as a service (faas) platform, for which reason boxes of Faas data access and Faas function invocation are added.

As illustrated ion FIG. 1B, the developer of the application may, based on application performance targets, decide to indicate that, for example, 4 functions, in this case $f_2$, $f_3$, $f_4$ and $f_5$, of the application have to be collocated in order decrease latency of processing of the application. Function affinity rules, in the form of an affinity group 112, comprising these 4 functions may be defined for this purpose.

By adding these characteristics, an application builder would define a different set of deployment units 114 comprising supporting libraries that typically are different from the libraries as used in the default deployment. This deployment of deployments units 114 is improved, or even optimized, for latency of running the application. It is noted that function 3, $f_3$, is invoking function $f_5$, and within the deployment unit 114, the invocation therefore is internal to the deployment unit. Also, functions $f_2$, $f_3$, $f_4$ and $f_5$, are thus deployed within one and the same deployment unit.

Moreover, FIGS. 1A and 1B schematically illustrate that a faas data access layer is defined between the function layer and the faas platform function invocation. The faas data access layer is abbreviated to "F. data access", herein. Also, layer of the faas platform function invocation is abbreviated to "F. Fn invoc.", herein. In the default deployment function invocations are present across the deployment units, where in the improved deployment, as presented in lower right, no invocations are present across the deployment units, rather only deployment unit internal invocations are present. Together with said supporting libraries, the deployment of the application on the faas platform may be significantly improved.

The functions of the default deployment are typically implemented as processors, whereas the collocated functions ($f_2$, $f_3$, $f_4$ and $f_5$) of the improved deployment are typically implemented as threads, threads having improved latency over processors.

By defining affinity rules, support may be provided to extend cloud platform functionality without access to/control of the cloud platform implementation and roadmap. Hence, the application builder may resolve feature deficits of the platform being used by adding specific supporting libraries when required.

The present disclosure thus offers to enhance functionality of existing cloud platforms. This is performed by adding an apparatus, such as an application builder component, that during building the deployment units, or artifacts, opts for a suitable implementation for each application programming interface (API) operations of function invocation and data access. Said function invocation and data access is conducted by the application blocks of the application based on requirements, as input by, for example, the developer, on application performance.

The proposed application builder component may also add selected the implementations of the API operations, to generated deployment units and bind, or constrain, each application group operations to an implementation selected.

The apparatus, or application builder component, may offer generic APIs for function invocation and for data access with several possible API provider implementations for each generic API. Said various providers of function invocation API may contribute with significantly different characteristics to the application performance. For example:

When a deployment unit, or artifact, artifact is being implemented at a faas platform, the application builder component may append API providers that are in line with the targeted faas platform. Although this allows scaling of the application block that belongs to the deployment unit to different servers, such scaling would introduce additional latency in function invocation and data access.

Moreover, when a deployment unit, or artifact, is being implemented at a faas platform, and where the deployment unit comprises of more than one application blocks, or functions, the application builder component may attach API providers that typically provide efficient invocations of application blocks belonging to that deployment unit. This results in a deployment that is improved, or even optimized, e.g., for latency, e.g. by using shared resources such as memory. Also, the attached API providers may allow these functions, being internal to the deployment unit, to scale on the same server, e.g. by using different threads. The scaling capability of these internal application blocks depend on the applied API providers, as well as the capability and limitations of the underlying faas platform, which however may prohibit group internal scaling. The attached API providers may on the one hand, allow scaling of each application block independently within the server. On the other hand, the faas platform may scale installing/uninstalling the group of application blocks as a single unit e.g. to different hardware (HW).

When application blocks are associated with different faas deployment units, the application builder may attach API providers to use e.g. function invocation features of the faas platform.

As noted above, the application builder component may select or opt for data access API providers as well. The action of binding or constraining occurs per data elements, for example state variables, with the condition that the names of the data elements have to be defined by the developer in compile time. On the one hand, this allows the developer to add performance requirements on the individual data accesses in advance. On the other, this approach imposes a limit to the developer, whom has to use compile time variable names, i.e. names cannot be generated in runtime. By default, the application builder component assumes that the data elements, which are accessed, are private to the application, i.e., no other applications are allowed to access them. The developer may have to explicitly indicate whether other applications are to access a data element, or not, as input to the application builder component.

The application builder then selects among various providers of data access APIs with different characteristics, for instance:

When a deployment unit, or artifact, comprises two or more application blocks, data elements accessed only by those application blocks can be implemented using an API provider that shares a variable storing memory between the application blocks to support low latency and high throughput.

When a data element is accessed by application blocks that are associated with different faas deployment units, or artifacts, or when the data element of the application, is declared as available by another application, a data externalization solution of the faas platform may be used and the appropriate API binding will be added.

The application builder component offers an interface to the developer that allows defining requirements or targets on the application performance. The developer may express these requirements or targets with the help affinity rules and hints.

The affinity rules and hints may comprise that the application blocks are to be organized into groups, which indicate the intent of the developer to deploy the functions of the group to the same server to minimize the latency. Input implementation hints may also indicate that an implementation being based on a local library, for function invocations within the application block group, is required.

The developer may also indicate preference on decreasing, or even minimizing, latency and providing resilient data storage for externalized data defined in compile time.

In one embodiment of the present disclosure the application blocks are functions provided with source code that is organized into at least one file. In this case the application builder may generate additional source code files that implement the binding of the API operations with the selected implementations. Those implementations may also be available as (generated) source code files. Then, the act of building the deployment unit, or artifact, is to construct a, so called, composite function that may comprise of all said source codes.

Figure 2:
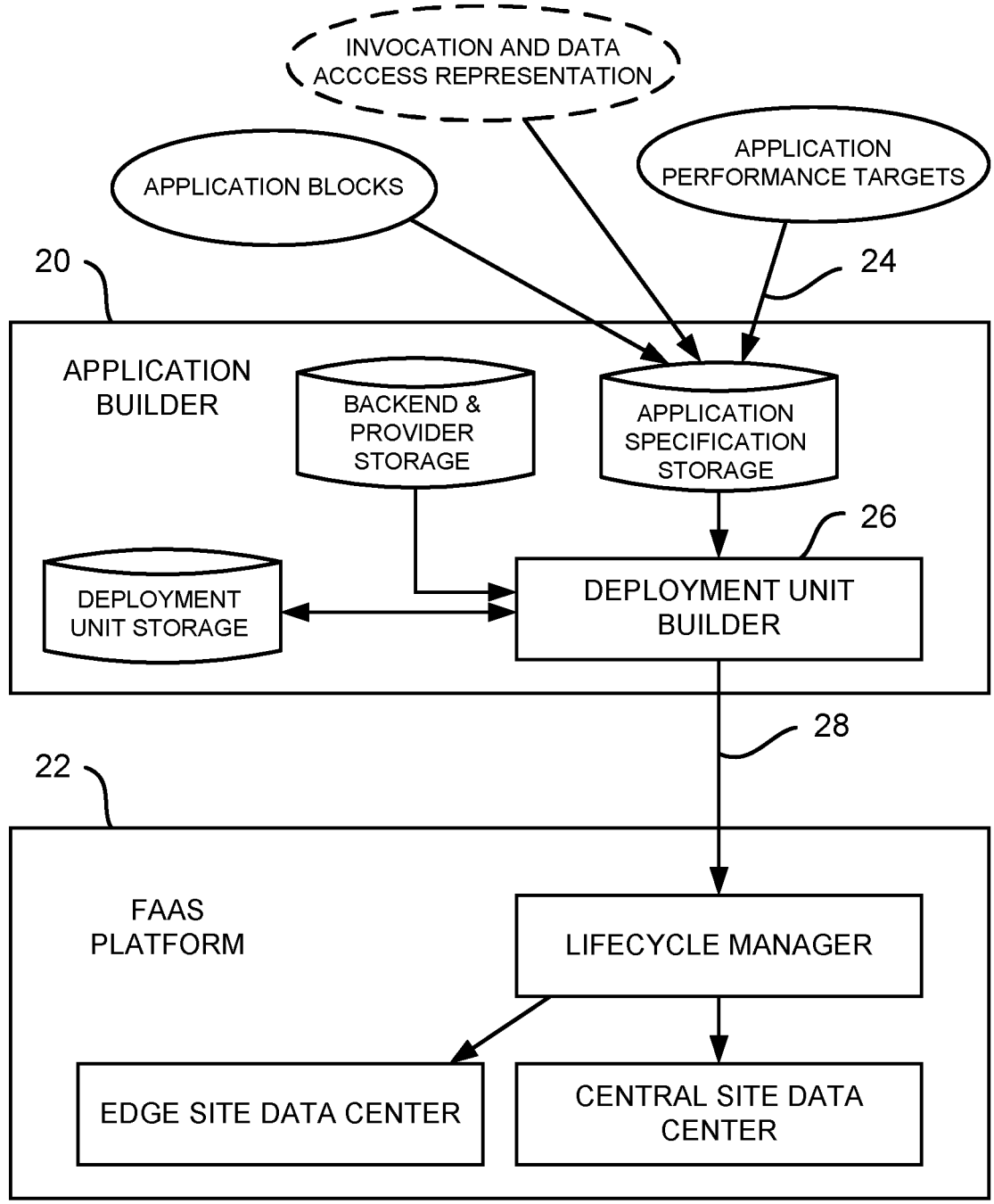
FIG. 2 schematically illustrates a functionality of an overall application builder and its relation to a function as a service platform.

FIG. 2 schematically illustrates a functionality of an overall application builder 20 and its relation to a faas platform 22. The apparatus of the present disclosure comprises a component of the application builder 20. This component is named deployment unit builder 26 in FIG. 2. FIG. 2 also visualizes a relation between the proposed deployment unit builder 26 and an existing faas platform 22 and their lifecycle manager components.

In an alternative scenario of the overall functionality, the application builder component may be integrated as part of a wider scope cloud platform.

In this scenario of the overall functionality, the application builder 20 comprises storage for application specifications. This storage stores information that specifies application logic. For example, the storage may specify:

A set of application blocks, or functions, which implement different parts of the application. The application blocks may be stored and managed as source code, such C++ or JAVA, or as compiled binary libraries.

At least one derived application performance target characteristics.

Optionally, a representation of invocations between the application blocks, and a representation of data accesses that are performed by the application blocks.

The application blocks and the application performance target characteristics are typically, provided by the application developer. The representations of invocations and data accesses may also be provided by the application developer, or they may be determined by the application builder using the source code of the application blocks. The application builder may comprise an interface 24 to be used by the deployer when providing application performance targets.

The application builder may also comprise a backend and provider storage that is adapted to store software components that are required when building, or generating, deployment units, or artifacts, from the application blocks. An example implementation of the application builder may store the following backend and API providers:

A library that is adapted to translate APIs for method invocation and data access, which APIs are provided by the faas platform.

A library that is adapted to provide low-latency implementation of method invocation APIs between application blocks that are deployed together in the same deployment unit, or artifact.

A library that is adapted to provide low-latency data sharing between application blocks that are deployed together in the same deployment unit, or artifact.

Thus, the application builder 20 comprises an application builder component, in the form of a deployment unit builder 26 that may be adapted to oversee constructing deployment units from application blocks, or components, according to derived target performance characteristics typically being expressed with application block, or function, affinity rules and for example implementation hints. In addition, the deployment unit builder 26 may generate input configuration for lifecycle management to install and uninstall the generated deployments units, or artifacts.

The deployment units, or artifacts, which are typically generated by the application builder component, may comprise the following elements:

A set of application blocks, or functions, typically being provided by the developer.

Selected libraries, if any, for invocations that are internal to the group of application blocks and per invocation configurations.

Selected libraries, if any, for configuration of data access and configuration of per data access invocation.

Deployment units may also comprise lifecycle management input for install/uninstall the deployment on the faas platform.

Deployment units may thus be onboarded 28 onto the faas platform 22, and comprise deployment configurations, and optionally install/uninstall scripts, which scripts are typically not generated within the application builder 20.

Figure 3:
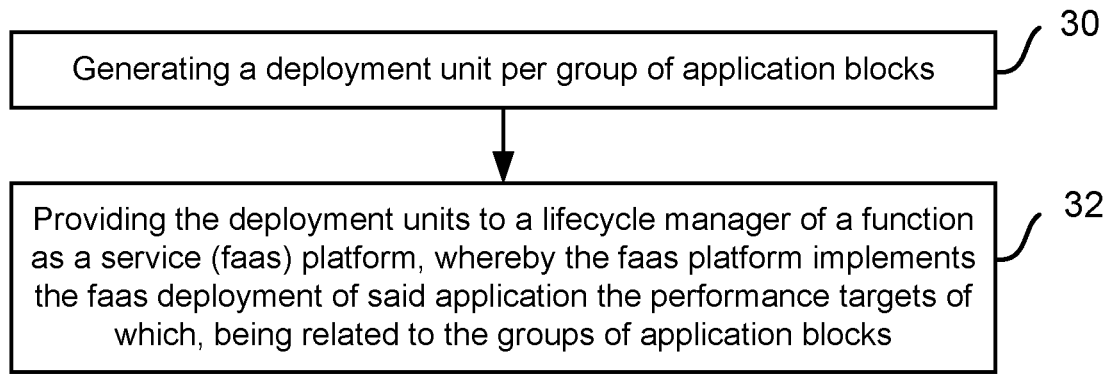
FIG. 3 illustrates a flowchart of a method according to an aspect of the present disclosure.

FIG. 3 presents a flowchart of actions of a method of providing a function as a service (faas) deployment of an application that comprises application blocks. This method is according to an aspect of the present disclosure. The method is performed in an application builder component, and comprises the following actions:

Action 30: Generating a deployment unit per group of application blocks, where the deployment unit comprises, in addition to the group of application blocks, an implementation of function invocation for each function being accessed by each group of application blocks. Generating the deployment unit further comprises constraining 604, 610, 612 function invocations of the group of application blocks to one or more libraries of implementations.

The groups of application blocks may be determined by grouping application blocks according to affinity group rules, based on said application performance targets.

Action 30 of generating the deployment units may further comprise, if there are groups of application blocks for which no deployment unit has been generated, for each such group of application blocks, initializing 502, a new deployment unit and adding 504, 506, to said new deployment unit, the functions of said each group of application blocks.

Action 30 of generating the deployment units, when constraining 604, 610, 612 function invocations of the group of application blocks to one or more libraries of implementations, if there are functions in the group of application blocks, which functions invoke other functions within the same group of application block, may also comprise adding 602, to the deployment unit being generated, a first library for handling invocations internal to the group of applications blocks, and constraining 604 the said invocations internal to the group of application blocks to said first library.

Within action 30 of generating the deployment units, constraining (604) may also comprise, augmenting or modifying function invocations in source code of a caller function to map data access calls to selected library based implementations or selected implementations of said first library.

Action 30 of generating the deployment units may also comprise, when constraining 604, 610, 612 function invocations of the group of application blocks to one or more libraries of implementations, and if there are functions invoking, or being invoked by, application blocks of another group of application blocks, adding 608, to the deployment unit being generated, a second library for handling invocations being external to the group of applications blocks, and constraining 610, 612 the said invocations external to the group of application blocks to said second library.

The method may also comprise providing adaptations to the faas platform by the second library, or where the second library is part of the faas platform.

If 700, 706 there are data elements in the group of application blocks, the deployment unit being generated may comprise implementations for data access, and the action 30 of generating said deployment unit per group of application blocks, may comprise constraining, or binding, 704, 710 invocations of data access of said data elements, of the group of application blocks, to a library handling said data access.

Action 30 may further comprise, if 700 there are data elements that are internal to the group of application blocks, adding 702 a library that handles said data elements being internal, and constraining 704 invocations of data access of said data elements being internal, of the group of application blocks, to the library that handles said data elements. It is noted that data elements being internal to the group of applications, means, and has the advantage, that data elements do not have to be accessed by program components that are external to the group of application blocks.

Within action 30 of generating the deployment units, constraining 704 may also comprise, augmenting or modifying data access instructions in source code of a caller function to map data access calls to selected library based implementations or selected implementations of said first library.

In addition, action 30 may also comprise, if 706 there are data elements that are external to the group of application blocks, adding 708 a library that handles said data elements being external, and constraining, or binding, 710 invocations of data access of said data elements being external, of the group of application blocks, to the library that handles said data elements.

Action 32: Providing the deployment units, together with the function invocations that are attached to said one or more libraries of implementations, to a lifecycle manager of a faas platform that is connected to the application builder component. The faas platform thereby implements the faas deployment of said application the performance targets of which, being related to the groups of application blocks.

The method of providing a function as a faas deployment of an application that comprises application blocks, may further comprise determining 46 configuration attributes to set up a storage module for data that is external to the groups of application blocks. Said storage module may be comprised by an underlying faas platform.

The method of providing a function as a faas deployment of an application may be performed in a component of an application builder.

The present disclosure also provides a computer program that comprises instructions, which when executed on at least one processor, cause the at least one processor to carry out the actions as mentioned above in connection with the flowchart of FIG. 3.

Figure 4:
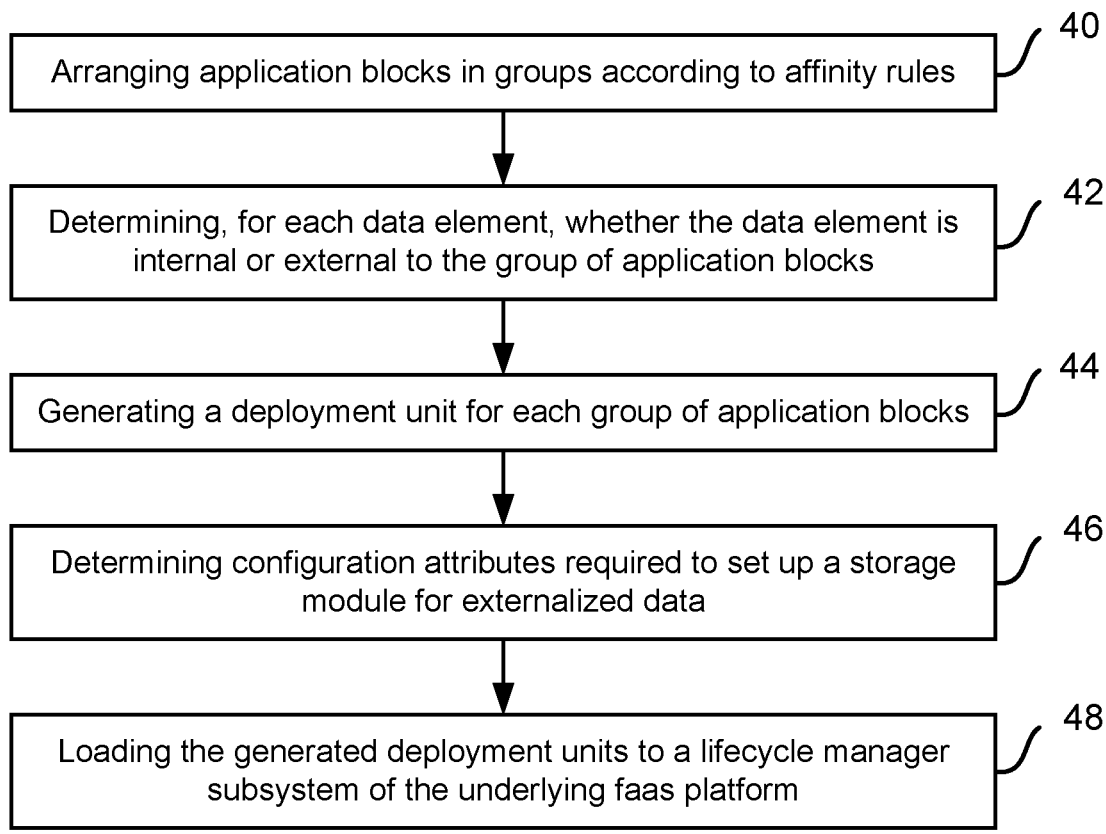
FIGS. 4-7 illustrate flowcharts of actions, according to some embodiments of the present disclosure.

FIG. 4 presents a flowchart of actions according to some further embodiments of the present disclosure.

Once a developer has uploaded its application blocks, which use generic APIs for invocation and data access, which are specific to the application builder, and its target performance requirements in form of affinity groups, the following actions may be conducted.

In action 40, the application builder component may arrange application blocks in groups according to affinity rules. The application builder component may define subsets of the application blocks, according to the affinity group definitions. The defined subsets may hence be referred to as groups of application blocks.

In action 42, the application builder component may process data elements that are accessed by two or more application blocks and determine whether the application blocks accessing the data element belong to the same group of application blocks. If so, the data element is classified as group internal. If not, the data element is considered to be group external, i.e. external to the group of application blocks. The application builder component may then reclassify each group internal data element as a group external function, in the case the group internal function satisfies one of the following conditions:

The developer has defined a preference for the data element on resilient access.

Data element content must be retained between invocations of the application block group. The indication of the condition may be a result of an input as provided by the developer.

In action 44, the application builder component may generate a deployment unit, or artifact, for each group of application blocks. Details of this action are to be specified in actions as specified further below.

In action 46, the application builder component may determine configuration attributes that are required to set up a storage module for externalized data, of the underlying faas platform. Furthermore, the application builder component may generate objects that specify configuration instructions, e.g., scripts, configuration files, which may describe how to configure the storage module. Exemplary configuration attributes may be a list of externalized data and their initial value.

In action 48, the application builder component may load, or onboard, the generated deployment units, or artifacts, to a lifecycle manager subsystem of the underlying faas platform. Loading of the deployment units may be performed together with configuration data required for instantiating the application in the faas platform, objects for configuration specification of externalized data storage, and, optionally, scripts that support installing/uninstalling the application at the faas platform.

Figure 5:
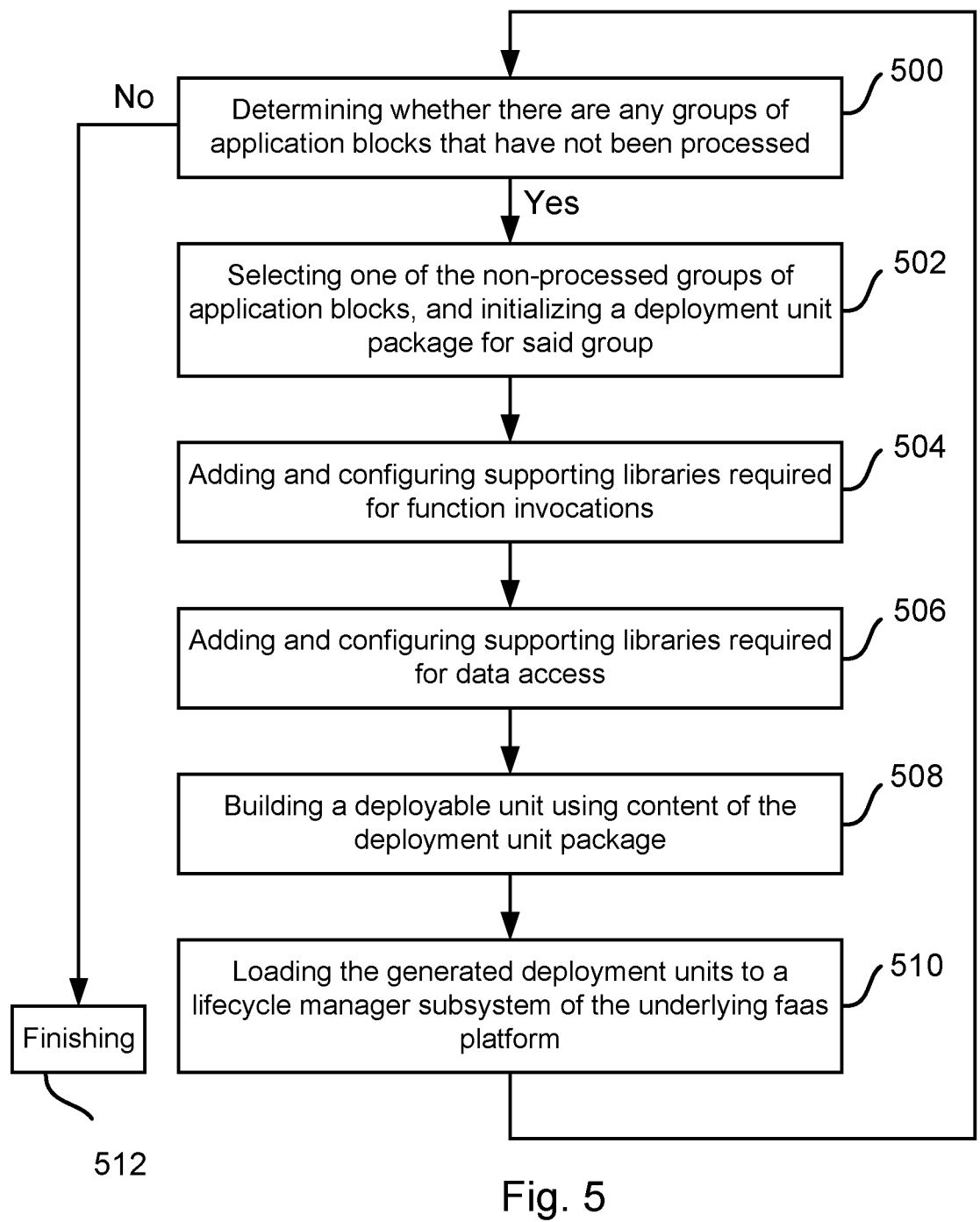

FIG. 5 presents a flowchart of some details of action 44, as presented in FIG. 4, of generating a deployment unit according to some embodiments of the present disclosure. The actions of FIG. 5 are iterated over the groups of application blocks, as were defined in action 40 of FIG. 4, and may generate deployable units, or artifacts, for each group of application blocks, in a manner as described below.

In action 500, the application builder component may check whether there are any groups of application blocks, which has not been processed, i.e., whether there groups of application blocks for which no deployment unit, or artifact, has yet been generated for them. If so, i.e., there are any groups of application blocks having no deployment unit, or artifact, the flowchart continues to action 502. A group of application blocks without a deployment unit associated may be regarded as a non-compiled group of application blocks.

If there are no groups of application blocks having no deployment unit, or artifacts, i.e. if all groups of application blocks already have an associated deployment unit, the actions of this flowchart may be considered to be performed, for which reason the flowchart continues with action 512 of finishing the flowchart.

In action 502, the application builder component may select one of the non-processed groups of application blocks, after which the application builder component may initialize a deployment unit package for the said selected group of application blocks. The initialization of the deployment unit package may comprise creating a new deployment unit package and adding the application blocks of the group of application blocks, thus the members of the group of application blocks, to the deployment unit package.

In action 504, the application builder component may attach libraries that are required to support function, or application block, invocations from one application block to another application blocks may be added to the artifact package, and may be configured. Some details of this action will be presented below.

In action 506, libraries that are required to support data access may be added to the artifact package and may be configured. Some details of this action will also be presented below.

In action 508, the application builder component may build a deployable unit, or artifact, using content of the artifact package, being the application blocks, the added supporting libraries for function invocation and data access, which may be custom, and the configurations of said libraries.

In action 510, the application builder component may mark the group of application blocks now being processed, as compiled, i.e., this group of application blocks will no longer be considered as non-processed, or non-compiled, in this flowchart, and the flowchart may continue by reiterating the flowchart and starting by action 500, as described above.

Figure 6:
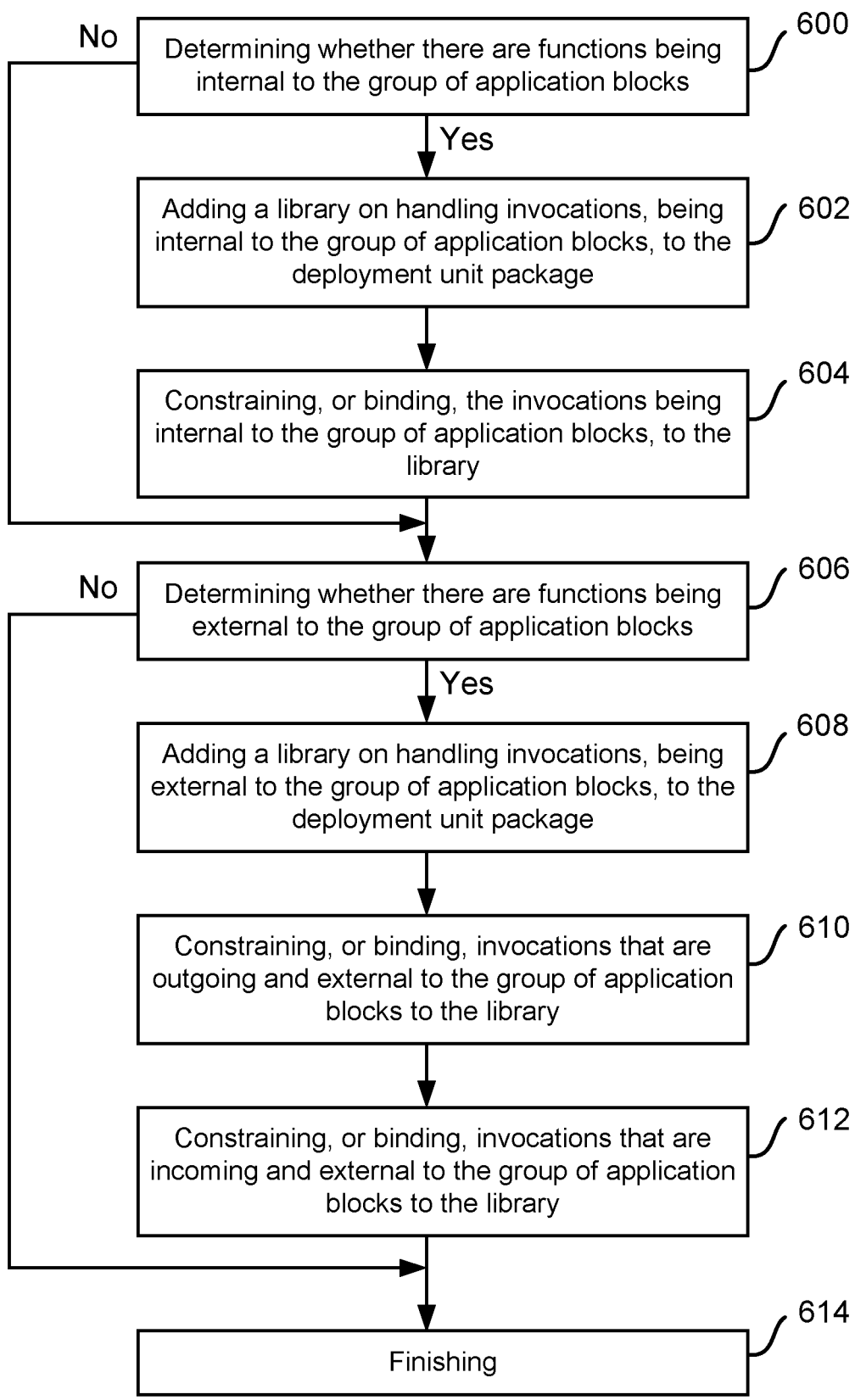

FIG. 6 presents a flowchart of some details of action 504, as presented in FIG. 5, of adding and configuring, or setting up, supporting libraries required for function invocations, according to some embodiments of the present disclosure.

In action 600, the application builder component may determine whether there is at least one function that is internal to the group of application blocks. In order to for a function, to be internal, both potentially invoking, and potentially invoked application blocks need to be part of the same group of application blocks.

In action 602, if there is at least one function, that is internal to the group of application blocks, the application builder component may add a library that provides an efficient implementation for such intra-group invocations.

In action 604, the application builder component may constrain, or bind, the invocations, being internal to the group of application blocks, to the added library. The application builder component may hereby secure that said library will implement the group internal invocations.

If there are no functions that are internal, as determined in action 600, the flowchart may continue with handling of invocations that are external to the group of application blocks, where either an invoking application block or an invoked application block belongs to another group of application blocks.

In action 606, the application builder component may determine whether there is at least one function that is external to the group of application blocks. In order to for a function, to be external, both potentially invoking, and potentially invoked application blocks need to be part of the same group of application blocks.

If there are no functions that are external, as determined in action 606, the flowchart may continue with action 614 of finishing said flowchart.

In action 608, if there is at least one such function, that is external to the group of application blocks, the application builder component may add a library that handles invocations that are external to the group of application blocks.

In action 610, the application builder component may implement external invocations that are outgoing as follows: The application builder component constrains, or binds, the implementations that are provided by the library, of the operator that provides the function invocations, to the operator that calls, or invokes, the corresponding application blocks.

In action 612, the application builder component may implement external invocations that are incoming as follows: The application builder component may program or configure the library to accept these invocations, process them and invoke an appropriate application block of the group of application blocks.

In action 614, the flowchart of FIG. 6 finishes.

According to another embodiment of the present disclosure, the actions of constraining, or binding, invocations to the libraries, in actions 604, 610, 612, are implemented as follows: The application builder component generates new software components that will execute zero, one or more functions of the said libraries to perform the function invocation of the group of application blocks. The application builder component may further alter the source code of an application block by substituting an original invocation to the invocation of the generated software component.

In addition, the application builder component may also add the generated software components to the artifact package, for which reason these software components will become part of the deployment unit, or artifact, which is loaded in, for instance, actions 48 and 510, of FIGS. 4 and 5, respectively.

In a further embodiment of the present disclosure, the actions of constraining, or binding, invocations to the library, as performed in action 604, may be implemented as follows. The application builder component changes the application block that implements the invocation by substituting an original invocation with zero, one or more functions of the said library.

Figure 7:
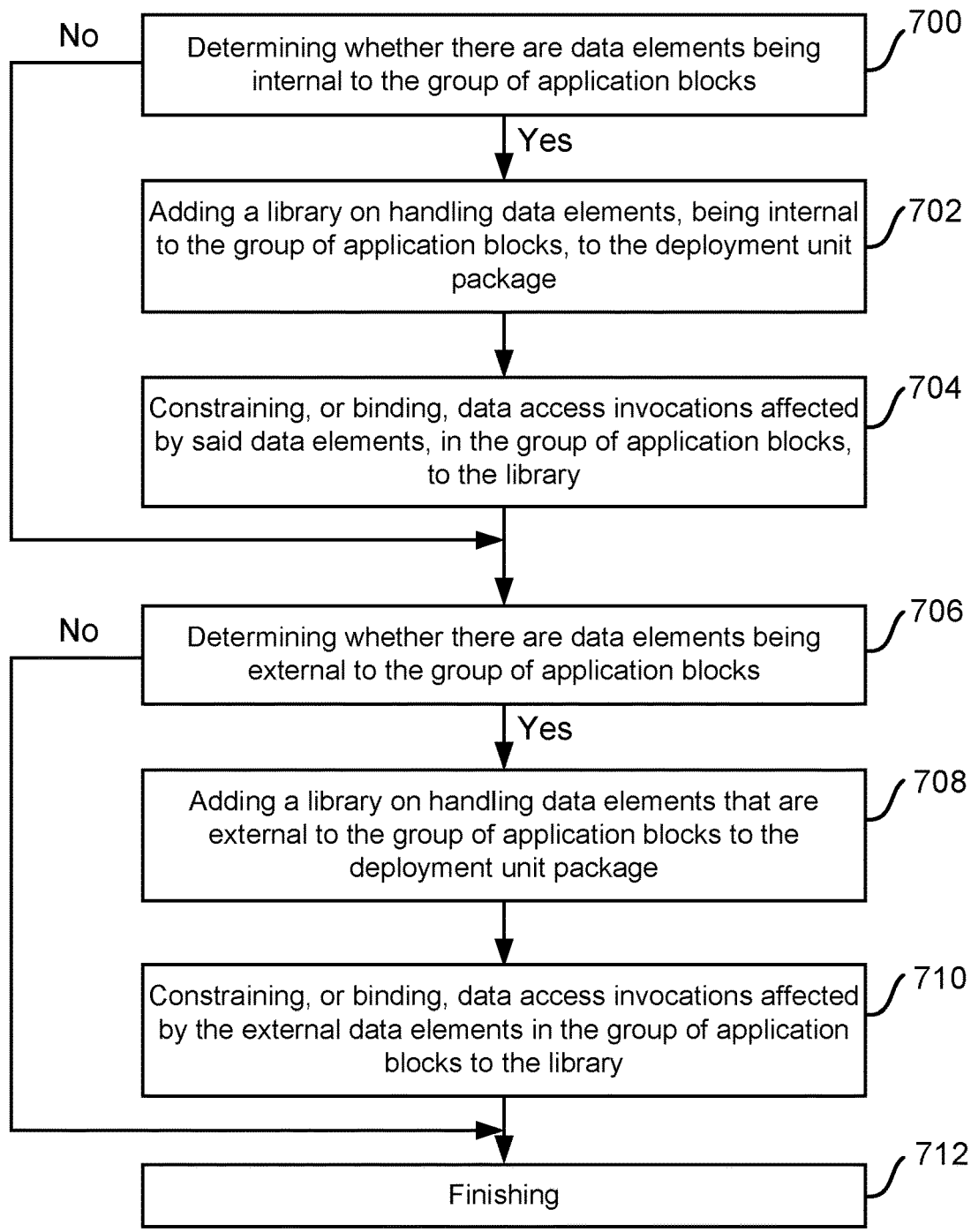

FIG. 7 presents a flowchart of some details of action 506, as presented in FIG. 5, of adding and configuring, or setting up, supporting libraries required for data access, according to some embodiments of the present disclosure. Actions of programming libraries for access to externalized data, some details of which, are presented in the flowchart of FIG. 7.

In action 700, the application builder component may determine whether there are data elements that are, or at least one data element that is, application group internal, associated to the group of application blocks.

In action 702, if there is at least one data element data that is application group internal, the application builder component may add a library that handles said at least one group internal data element. This action may also comprise configuring of said added library.

In action 704, the application builder component may constrain, or bind, data access operations, affected by said data elements, to the implementations provided by the library.

The application builder may further also augment or modify data access instructions in source code of a caller function to map data access calls to selected library based implementations or selected implementations of the first library.

If there are no data elements being internal to the group of application blocks, as determined in action 700, the flowchart bypasses actions 702 and 704, and directly continues to action 706.

In this action 706, the application builder component may determine whether there are data elements that are, or at least one data element that is, application group external associated with the group of application blocks.

In action 708, if there is at least one data element data that is application group external, the application builder component may add a library that handles said at least one group external data element, to the deployment unit package.

In action 710, the application builder component may constrain, or bind, data access operations, i.e. invocations affected by the external data elements, with the implementations as provided by the library.

If there are no data elements being external to the group of application blocks, as determined in action 706, the flowchart bypasses actions 708 and 710, and directly continues to action 712.

Said action 712, comprises finishing the flowchart of FIG. 7.

According to yet a further embodiment of the present disclosure, an implementation is provided in which both the deployer-provided application blocks and the supporting libraries, are given as source codes. In this case, the action of constraining, or binding, of an API invocation to a corresponding implementation as provided by a library, may be performed by:

making use of language elements and structures as provided by the source code language, such as templates in C++ or generics in Java; or via generating constraining, or binding, details, and optionally modifying invocation API call in the application blocks.

As the described methods and flowcharts may depend on capabilities of the programming language and the implementation of the library, both above constraining, or binding, options may be used together in the same application.

According to yet another implementation, both, the user provided application blocks and the supporting libraries may be given as processed, or compiled, objects. The action of constraining, of binding, the API invocation to the corresponding library provided implementation, may be performed via linking together the processed, or compiled, objects.

According to yet another implementation, although both, the user provided application blocks and the supporting libraries are given as source codes, the application builder component may first process, or compile, the application blocks and the supporting libraries into objects, and may then bind the API invocations to the corresponding library provided implementations, via linking.

Figure 8:
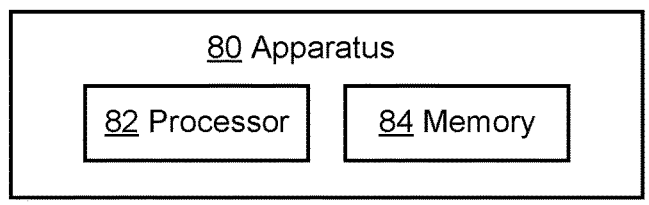
FIG. 8 schematically illustrates an apparatus, according to another aspect of the present disclosure.

FIG. 8 schematically presents an apparatus 80 capable of providing a function as a faas deployment of an application that comprises application blocks, where the apparatus comprises a processor 82 and memory 84. The apparatus is configured to generate a deployment unit per group of application blocks, where the deployment unit comprises, in addition to the group of application blocks, an implementation of function invocation for each function being accessed by each group of application blocks. The apparatus is also configured to constrain function invocations of the group of application blocks to one or more libraries of implementations. The apparatus is also be configured to provide the deployment units, together with the function invocations attached to said one or more libraries of implementations, to a lifecycle manager of a faas platform that is connectable to the apparatus, whereby the faas platform is adapted to implement the faas deployment of said application the performance targets of which, being related to the groups of application blocks.

The apparatus 80 may comprises a component of an application builder.

The component of the application builder may comprise a deployment unit builder 26, or an artifact builder.

The present disclosure also provides an apparatus that is capable of providing a function as a faas deployment of an application comprising application blocks, where the apparatus is implemented as a computer program. This computer program comprises instructions, which when executed on at least one processor, cause the at least one processor to generate a deployment unit per group of application blocks, where the deployment unit comprises, in addition to the group of application blocks, an implementation of function invocation for each function being accessed by each group of application blocks, and to constrain function invocations of the group of application blocks to one or more libraries of implementations. The computer program instructions, when executed on at least one processor, also cause the at least one processor to provide the deployment units, together with the function invocations attached to said one or more libraries of implementations, to a lifecycle manager of a faas platform that is connectable to the apparatus, whereby the faas platform is adapted to implement the faas deployment of said application the performance targets of which, being related to the groups of application blocks.

It is noted that the deployment unit builder function of the application builder may be implemented with a standalone application component that is running the cloud. Associated storages may be implemented using storage services that are provided by the cloud infrastructure. The cloud platform may take over some API related functions from the application builder, for example, an API gateway.

It is further noted that the above described embodiments are only given as examples and should not be limiting to the present exemplary embodiments, since other solutions, uses, objectives, and functions are apparent within the scope of the accompanying patent claims.

It will be appreciated by those skilled in the art that the figures herein can represent conceptual views of functional units embodying the principles of the technology.

The functions of various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented.

The embodiments described above are to be understood as a few illustrative examples of the present disclosure. It will be understood by those skilled in the art that various modifications, combinations and changes may be made to the embodiments without departing from the scope of the present disclosure. In particular, different part solutions in the different embodiments can be combined in other configurations, where technically possible.

Advantages of at least some of the embodiments as disclosed herein.

As noted above, the proposed disclosure enables a developer of an application to adjust the performance characteristics of an application significantly without having to change the logic of application implementations, i.e. without having to make any changes to the code of the application blocks.

Hence, providing a function as a service (faas) deployment of an application having application blocks, significantly improves the application's flexibility in two respects, of which one is reusability of the code as part of another application, since the code does not need to be specially adapted to any application. The other respect being the ability to adjust requirements on the target performance, for instance in the case the application grows larger or if there is a need to deploy the application on different types of cloud deployment units, for instance when a new deployment of the application is implemented in a new edge cloud area.

ABBREVIATIONS

API application programming interface
FAAS function as a service
HW hardware

The invention claimed is:

1. A method of providing a function as a service (FaaS) deployment of an application comprising application blocks, the method comprising an application builder component:
generating a deployment unit per group of application blocks, wherein the deployment unit comprises, in addition to the group of application blocks, an implementation of function invocation for each function being accessed by each group of application blocks, and wherein generating the deployment unit comprises constraining function invocations of the group of application blocks to one or more libraries of implementations;

providing the deployment units, together with the function invocations attached to the one or more libraries of implementations, to a lifecycle manager of a FaaS platform that is connected to the application builder component; and
whereby the FaaS platform implements the FaaS deployment of the application, performance targets of which are related to the groups of application blocks.

2. The method of claim 1, wherein the groups of application blocks are determined by arranging application blocks in groups according to affinity group rules, based on the performance targets of the application.

3. The method of claim 1, wherein the generating of the deployment unit comprises, if there are groups of application blocks for which no deployment unit has been generated, for each such group of application blocks, initializing a new deployment unit and adding to the new deployment unit, the functions of the each such group of application blocks.

4. The method of claim 1, wherein constraining function invocations of the group of application blocks to one or more libraries of implementations comprises, if there are functions in the group of application blocks, which functions invoke other functions within the same group of application blocks:
adding to the deployment unit being generated, a first library for handling invocations internal to the group of applications blocks; and
constraining the invocations internal to the group of application blocks to the first library.

5. The method of claim 4, wherein the constraining comprises augmenting or modifying function invocations in source code of a caller function such that the function invocations map to selected library implementations.

6. The method of claim 1, when the constraining comprises, if there are functions invoking, or being invoked by, application blocks of another group of application blocks:
adding, to the deployment unit being generated, a second library for handling invocations being external to the group of applications blocks; and
constraining the invocations external to the group of application blocks to the second library.

7. The method of claim 6, further comprising providing adaptations to the FaaS platform by the second library.

8. The method of claim 1, wherein the generating the deployment unit comprises, if there are data elements in the group of application blocks, the generating of the deployment unit further comprises:
generating the deployment unit comprising implementations for data access; and
constraining data access of the data elements, of the group of application blocks, to a library handling the data access.

9. The method of claim 8, further comprising, if there are data elements that are internal to the group of application blocks:
adding a library that handles the data elements being internal; and
constraining data access of the data elements being internal of the group of application blocks to the library that handles the data elements.

10. The method of claim 9, wherein the constraining the data access comprises augmenting or modifying data access instructions in source code of a caller function to map data access calls to selected library-based implementations.

11. The method of claim 8, further comprising, if there are data elements that are external to the group of application blocks:
adding a library that handles the data elements being external; and
constraining data access of the data elements being external of the group of application blocks to the library that handles the data elements.

12. The method of claim 1, further comprising determining configuration attributes to set up a storage module for data that is external to the groups of application blocks.

13. A non-transitory computer readable recording medium storing a computer program product for providing a function as a service (FaaS) deployment of an application comprising application blocks, the computer program product comprising program instructions which, when run on processing circuitry of a device, causes the device to:
generate a deployment unit per group of application blocks, wherein the deployment unit comprises, in addition to the group of application blocks, an implementation of function invocation for each function being accessed by each group of application blocks, and wherein generating the deployment unit comprises constraining function invocations of the group of application blocks to one or more libraries of implementations;
provide the deployment units, together with the function invocations attached to the one or more libraries of implementations, to a lifecycle manager of a FaaS platform that is connected to an application builder component; and
whereby the FaaS platform implements the FaaS deployment of the application, performance targets of which are related to the groups of application blocks.

14. An apparatus capable of providing a function as a service (FaaS) deployment of an application comprising application blocks, the apparatus comprising:
processing circuitry;
memory containing instructions executable by the processing circuitry whereby the apparatus is operative to:
generate a deployment unit per group of application blocks, wherein the deployment unit comprises, in addition to the group of application blocks, an implementation of function invocation for each function being accessed by each group of application blocks;
constrain function invocations of the group of application blocks to one or more libraries of implementations;
provide the deployment units, together with the function invocations attached to the one or more libraries of implementations, to a lifecycle manager of a FaaS platform that is connectable to the apparatus; and
whereby the FaaS platform is adapted to implement the FaaS deployment of the application, performance targets of which are related to the groups of application blocks.

15. The apparatus of claim 14, wherein the apparatus comprises a component of an application builder.

16. The apparatus of claim 15, wherein the component comprises a deployment unit builder.

* * * * *